United States Patent [19]

Chettiath

[11] Patent Number: 4,735,995

[45] Date of Patent: Apr. 5, 1988

[54] WATER REDUCIBLE ACRYLIC MODIFIED POLYESTER COMPOSITIONS

[75] Inventor: Jose J. Chettiath, Homewood, Ill.

[73] Assignee: The Sherwin-Williams Company, Cleveland, Ohio

[21] Appl. No.: 31,326

[22] Filed: Mar. 27, 1987

[51] Int. Cl.[4] .......................................... C08F 257/02
[52] U.S. Cl. ................................. 525/301.5; 524/529
[58] Field of Search .............. 524/529; 525/301, 301.5

[56] References Cited

U.S. PATENT DOCUMENTS

| | | | |
|---|---|---|---|
| 2,549,767 | 4/1951 | Bobalek | 525/301.5 |
| 3,355,403 | 11/1967 | Hahn | 525/301.5 |
| 4,129,537 | 12/1978 | Dhein | 525/301.5 |
| 4,360,640 | 11/1982 | Tobias | 525/301 |

*Primary Examiner*—Paul R. Michl
*Assistant Examiner*—Patrick A. Doody
*Attorney, Agent, or Firm*—Robert E. McDonald; James V. Tura

[57] ABSTRACT

This invention relates to a novel air drying acrylic modified polyester composition and to the method of preparing said compositions which are particularly useful in forming coatings on various substrates and particularly on metal surfaces. The acrylic modified polyesters are water reducible and are obtained from the copolymerization of a polyester prepolymer and a combination of ethylenically unsaturated vinyl monomers comprising at least one acrylic monomer. The prepolymers are derived from the reaction of a styrene-allylic alcohol polymer with a mixture of unsaturated monocarboxylic acids comprising at least one unsaturated fatty acid and at least one monoanhydride having at least one free carboxylic acid group.

20 Claims, No Drawings

WATER REDUCIBLE ACRYLIC MODIFIED POLYESTER COMPOSITIONS

This invention is directed to water dispersible coating compositions and more specifically to water reducible air drying acrylic modified polyester compositions particularly useful as an aftermarket automotive coating. The water reducible acrylic modified polyesters of this invention are derived from the copolymerization of (a) polyester prepolymers and (b) a combination of ethylenically unsaturated vinyl monomers, wherein the prepolymers are derived from the reaction of a styrene-allylic alcohol polymer with mixtures of unsaturated monocarboxylic acids including one or more of the unsaturated fatty acids and at least one monoanhydride having at least one free carboxylic acid group. Coatings formulated from the acrylic modified polyesters of this invention dry rapidly to a tack-free finish capable of being cured at room or ambient temperatures and form coatings that have good physical characteristics, i.e. high gloss, water spot resistance, resistance to humidity and excellent adhesion to metal substrates. Heretofore, compositions containing acrylic ester resins have the drying oil fatty acid esters attached to an acrylic segment, but do not have the characteristics required of an automotive finish.

The acrylic modified polyesters of this invention are air curable acrylic modified polymers having groups derived from unsaturated drying oil fatty acids, carboxyl groups, and carboxy ester groups, with the carboxyl groups being present in amounts sufficient to render the acrylic modified polyesters soluble in aqueous solvents, i.e. water containing organic cosolvents, etc.

SUMMARY OF THE INVENTION

This invention relates to water reducible air drying acrylic modified polyesters having acid values greater than about 25 obtained by the copolymerization of (a) from about 50 to 70 parts by weight of a polyester prepolymer, and (b) from about 30 to 50 parts by weight of at least one ethylenically unsaturated vinyl monomer such as acrylic acid or methacrylic acid, etc. The polyester prepolymers are obtained from the reaction of a styrene-allylic alcohol polymer with at least one unsaturated fatty acid, e.g. soya fatty acid, and an unsaturated monocarboxylic acid characterized by the formula:

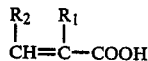

wherein $R_1$ is either hydrogen or an alkyl group of 1 to 3 carbon atoms and $R_2$ is an aliphatic group of 1 to 4 carbon atoms or an aryl group to obtain a hydroxy-functional polymer and subsequently reacting said hydroxy-functional polymer with a monoanhydride having at least one free carboxylic acid group.

Further, this invention relates to a method of preparing water-reducible air drying acrylic modified polyesters having acid values greater than about 25 which comprises copolymerizing (a) from about 50 to 70 parts by weight of a polyester prepolymer, and (b) from about 30 to 50 parts by weight of a combination of ethylenically unsaturated vinyl monomers, e.g. acrylic acid etc. The polyester prepolymers are obtained from the reaction of (i) a styrene-allylic alcohol polymer with (ii) at least one unsaturated fatty acid, and (iii) at least one unsaturated monocarboxylic acid having the formula:

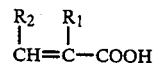

wherein $R_1$ is either hydrogen or an alkyl group of 1 to 3 carbon atoms and $R_2$ is an aliphatic group of 1 to 4 carbon atoms or an aryl group to obtain hydroxy-functional polymers and subsequently reacting said hydroxy-functional polymers at lower temperatures, e.g. up to about 320° F. with (iv) at least one monoanhydride having at least one free carboxylic acid group.

Accordingly, it is an object of this invention to provide a novel water reducible, air drying acrylic modified polyester for use in the preparation of water borne coatings for the automotive aftermarket. It is another object of this invention to provide a method of preparing said water reducible, acrylic modified polyesters.

It is another object of this invention to provide a method of preparing water-reducible, air drying vinyl modified polyesters capable of being formulated into water reducible paints for use on metal substrates.

It is a further object of this invention to provide a water borne coating containing a vinyl modified polyester composition and a method of preparing said composition for use on a variety of various substrates under a wide range of conditions.

It is a further object of this invention to provide a water reducible acrylic modified polyester capable of being formulated into water reducible paints for application on a variety of substrates which dry to tack-free coatings having good physical characteristics such as water spot resistance, high gloss, resistance to humidity and excellent adhesion to metal substrates.

These and other objects of the invention will become apparent from a more detailed description of the invention as follows.

DESCRIPTION OF THE INVENTION

The water reducible air drying vinyl modified polyesters, i.e., the acrylic modified polyesters of this invention, are obtained by the copolymerization of (a) from about 50 to 70 parts by weight of a polyester prepolymer and preferably from about 55 to 65 parts by weight of the prepolymer copolymerized with (b) about 30 to 50 parts by weight and preferable with about 35 to 45 parts by weight of at least one ethylenically unsaturated vinyl monomer such as acrylic or methacrylic acids and the like. The polyester prepolymers from which the vinyl modified polyesters are obtained are derived from the reaction of a styrene-allylic alcohol polymer and at least one unsaturated fatty acid, e.g. drying oil fatty acids such as soya fatty acid, and an unsaturated monocarboxylic acid such as crotonic acid characterized by the formula:

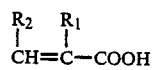

wherein $R_1$ is either hydrogen or an alkyl group of 1 to 3 carbon atoms and $R_2$ is an aliphatic group of 1 to 4 carbon atoms or an aryl group to obtain a hydroxy-functional polymer, and then subsequently reacting said hydroxy-functional polymer, at lower temperatures, with at least one monoanhydride having at least one free carboxylic acid group.

More particularly, the polyester prepolymers are obtained from the reaction of 40 to 65 parts by weight and preferably 50 to 60 parts by weight of the styrene-allylic alcohol polymer with about 15 to 35 parts, and preferably 20 to 30 parts, by weight of at least one unsaturated fatty acid such as soya fatty acid and from about 5 to 15 parts by weight and preferably 8 to 12 parts by weight of at least one unsaturated monocarboxylic acid such as crotonic acid, or other monocarboxylic unsaturated acid which will not homopolymerize at esterification temperatures to obtain a hydroxy-functional polymer. The hydroxy-functional polymer is then reacted with about 5 to 15, and preferably 3 to 10, parts by weight of at least one monoanhydride having at least one carboxylic acid group, such as trimellitic anhydride.

In general, the air drying vinyl modified polyesters of this invention are obtained from the reaction of the styrene-allylic alcohol e.g. styrene-allyl alcohol copolymer with the unsaturated fatty acid and the unsaturated monocarboxylic acid in the presence of solvents at temperatures ranging up to about 480° F. After the reaction mixture is cooled to about 330° F., the monoanhydride such as trimellitic anhydride is added to the reaction and held at these temperatures until a water dispersible polyester prepolymer is obtained which is characterized as having acid values greater than about 20 and preferably an acid value greater than about 25. This polyester prepolymer is subsequently reacted in the presence of organic solvents with the ethylenically unsaturated vinyl monomer such as acrylic or methacrylic acid at temperatures ranging from room temperatures up to about 280° F.

More specifically, the water reducible vinyl modified polyesters are obtained from the copolymerization of about 50 to 70 parts by weight of the polyester prepolymer, e.g. having an acid value greater than about 25, with about 30 to 50 parts by weight of at least one of the ethylenically unsaturated vinyl monomers including one or more of the acrylic monomers such as the hydroxyalkylacrylates, methylmethacrylates, methylmethacrylic acid, isobornyl acrylic acid, etc. either alone or in combination with styrene in any proportion. Preferably, the ethylenically unsaturated vinyl monomers comprise mixtures of acrylic or methacrylic acid, etc. in amounts ranging from about 5 to 15 and more preferably from about 8 to 12 parts by weight of the acrylic or methacrylic acid or any mixture of these vinyl monomers. It is essential that a sufficient amount of the acrylic or methacrylic acid, etc. be present in the unsaturated vinyl monomer mixture to react with the polyester prepolymer to obtain vinyl modified polyesters having acid values above 30 and preferably acid values above 40.

The prepolymer, i.e. the polyester prepolymer, is prepared from the reaction of the unsaturated drying oil fatty acid and the unsaturated monocarboxylic acid with a copolymer of styrene and an allylic alcohol. These copolymers of styrene and allylic alcohols are prepared by free radical addition polymerization techniques well known in the art by mixing the styrene and allylic alcohol in the presence of a free radical catalyst at temperatures ranging from about 180° F. to about 480° F. The styrene and allylic alcohols are present in ratios ranging from about 0.01 to 100 equivalents of styrene for each equivalent of the allylic alcohol. Preferably, however, the ratio between the allylic alcohol and styrene ranges from 1 to 5 equivalents of styrene for each equivalent of the allylic alcohol. The $C_3-C_7$ allylic alcohols are characterized by the formula:

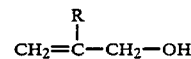

wherein R is hydrogen or a $C_1-C_4$ alkyl radical such as methyl, ethyl, propyl or butyl. The preferred alcohol, however, is allyl alcohol wherein R is hydrogen. Particularly preferred styrene allyl alcohol copolymers are available commercially from the Monsanto Company under designations RJ100 ® and RJ101 ®. These product may be characterized as having a hydroxyl content (weight percent) of approximately 6%, a specific viscosity of approximately 0.65, a hydroxyl equivalent weight of about 285–315, a number average molecular weight of about 1,600, a weight average molecular weight of about 2,340, and a specific gravity of about 1.0. Based on the number average molecular weight, the RJ100 ® has approximately 5.3 moles of hydroxyl per molecule and 12.3 moles of styrene per molecule.

The styrene copolymerized with the allylic alcohol includes the alkyl substituted styrenes, i.e. $C_1-C_4$ substituted styrene, wherein the alkyl substituent is either in the ortho, meta or para position. The free radical initiators or catalysts used in the preparation of the styrene-allylic alcohol copolymers include the organic peroxides or other compounds known to produce free radicals under the reaction conditions as well as various forms of radiation, e.g. ultraviolet light, X-rays, etc.

The unsaturated fatty acids reacted with the styrene-allylic alcohol copolymers include the acids having the general formula:

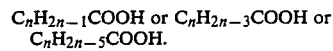

The preferred acids include oleic acid, linoleic acid, sorbic acid, linolenic acid, and various mixtures thereof.

Fatty acids are commercially available as mixtures of a number of different acids present in the original fat or oil. Coconut fatty acid, for example, is a mixture of fatty acids which contain some saturated acid as well as unsaturated acids. Soya fatty acid, for example, contains a number of saturated acids with carbon chains longer than 18 carbons and about 22% to 30% of enoic unsaturated acid, 50% to about 60% dienoic unsaturated acids and anywhere from 2% to 10% trienoic unsaturated acids. While various combinations of the unsaturated and saturated fatty acids can be used for purposes of this invention, it is preferred, however, to use mixtures of fatty acids derived from soya bean and coconut oils. Of all of the drying oil fatty acids, however, the preferred include oleic acid, linoleic acid, linolenic acid, ricinoleic acid and particularly a mixture of fatty acids derived from coconut and soya bean oil such as coconut fatty acid and soya fatty acid, etc. These drying oil fatty acids are obtained from soya oil, dehydrated caster oil, linseed, tung oil, safflower oil, and the like. Synthetic mixtures of these drying oil fatty acids may be used, e.g. mixtures of oleic and linoleic and conjugated linoleic acid are preferred.

In addition to the unsaturated fatty acids, the monocarboxylic unsaturated acids include acids characterized by the formula:

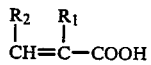

wherein $R_1$ is either hydrogen or an alkyl group of 1 to 3 carbon atoms and $R_2$ is an aliphatic group of 1 to 4 carbon atoms or an aryl group. For example, the preferred acids include crotonic acid, tiglic acid, and cinnamic acid, and various mixtures thereof in any proportion.

The reaction between the styrene-allylic alcohol copolymer, the unsaturated fatty acids and the usaturated monocarboxylic acids, e.g. crotonic acid, are carried out under conventional condensation polymerization conditions well known in the art.

The hydroxy-functional polymers derived from the styrene-allylic alcohol polymer and mixtures of unsaturated fatty acids and monocarboxylic acids are subsequently reacted at lower temperatures, e.g. below about 320° F., with sufficient amounts of at least one monoanhydride having at least one free carboxylic acid group, e.g. monocarboxylic acid monoanhydride, such as trimellitic anhydride, to obtain polyesters having acid values above 25, e.g. from about 25 to 30 and higher. The hydroxy-functional polymers are reacted with the monoanhydrides at temperatures ranging from about 320° F. to 330° F. in the presence of various organic solvents such as butyl Cellusolve ®, etc.

While trimellitic anhydride is preferred as the monoanhydride for purposes of this invention, there are various other monoanhydrides having at least one free carboxylic acid group which may be used, including for example, 2,6,7-naphthalene tricarboxylic anhydride, 3,3',4-diphenyl tricarboxylic anhydride, 3,3',4-benzophenone tricarboxylic anhydride, 1,3,4-cyclopentane tricarboxylic anhydride, 2,2',3-diphenyl tricarboxylic anhydride, diphenylsulfone-3,3',4-tricarboxylic anhydride, 1,2,5-naphthalene tricarboxylic anhydride, ethylene tricarboxylic anhydride, 1,2,4-butane tricarboxylic anhydride, 3,4-dicarboxyphenol-3'-carboxyphenylether monoanhydride, 1,2,3,4-cyclohexane tricarboxylic anhydride. Other aliphatic tricarboxylic anhydrides include the monoanhydrides of the cycloaliphatic tricarboxylic acids. Still further, other monoanhydrides include, for example, 3,4,10-propylene tricarboxylic anhydride, benzophenone tricarboxylic anhydride, 3,4,3'-diphenylmethane tricarboxylic anhydride, 3,4,3'-diphenylether tricarboxylic anhydride, 3,4,3'-diphenylsulfide tricarboxylic anhydride, 3,4,3'-diphenylketone tricarboxylic anhydride, 3,4,10-perylene tricarboxylic anhydride, 3,4-dicarboxyphenyl-3-carboxyphenylether anhydride, 2,6-dichloronaphthalene-4,5,7-tricarboxylic anhydride, 1-(2,3-dicarboxyphenyl)-1-(3-carboxyphenyl)ethane anhydride, 1,2,3-benzene tricarboxylic anhydride, diphenylisopropylidene-3,3',4-tricarboxylic anhydride, 3,4,3'-diphenyl tricarboxylic anhydride, 3,4,3'-diphenylmethane tricarboxylic anhydride, 3,4,3'-diphenylether tricarboxylic anhydride, 3,4,3'-diphenylpropane tricarboxylic anhydride, 2,3,5-pyridine-tricarboxylic anhydride, and the like. Any of these monoanhydrides having at least one free carboxylic acid group may be used for purposes of this invention either alone or in combination in any proportion as the monoanhydride to obtain the polyester prepolymers defined herein.

For purposes of this invention, in addition to these polyfunctional monoanhydrides, e.g. trimellitic anhydride other carboxylic monoanhydrides that may be used include the maleinized unsaturated fatty acids. More specifically, a commercially available fatty acid comprising a combination of oleic, linoleic acid and conjugated linoleic acids in the ratio of about 20, 70 and 10 are available commercially as Pamolyn 200 ®. These fatty acids may be reacted with maleic anhydride to obtain a reaction product substantially characterized as a fatty acid substituted maleic anhydride. These maleinized oleic and linoleic acids are obtained by reacting approximately chemical equivalents of both the acid and the anhydride at temperatures ranging from about 350° F. to 400° F. Thus, one or more conjugated fatty acids may be added to an unsaturated anhydride such as maleic anhydride by the Diels-Alder reaction to obtain a reaction product characterized as a monocarboxy or fatty acid substituted monoanhydride. The preferred fatty acids include the conjugated fatty acids or the drying oil fatty acids such as oleic acid, linoleic acid, linolenic acid, eleostearic acid, ricinoleic acid, and various combinations or mixtures of these acids in any proportion. These drying oil fatty acids are obtained from dehydrated caster oil, linseed oil, soya oil, tung oil, safflower oil, sunflower seed oil, and the like. The preferred mixture comprises oleic, linoleic and conjugated linoleic acid.

In addition to the maleic anhydride, other ethylenically unsaturated anhydrides that may be used include itaconic anhydride, propenyl succinic anhydride, citraconic anhydride, mesaconic anhydride, cyclohexane dicarboxylic anhydride, and endomethylene cyclohexane dicarboxylic anhydride, etc. These reaction products contain sufficient unsaturation to enable them to react with the ethylenically unsaturated acrylic monomers, i.e. the conjugated unsaturated fatty acids residues of oleic or linoleic.

The polyester prepolymers are prepared in the presence of a variety of organic solvents the amount of which will depend on the viscosity of the reaction mixture and includes such organic solvents as xylene, toluene, benzene, acetates such as butyl acetate, isopropyl acetate, Cellusolve ® acetate, ketones such as methyl ethyl ketone, methyl isobutyl ketone, acetone, alcohols such as methyl alcohol, ethyl alcohol, the aliphatic, cycloaliphatic or aromatic hydrocarbons and the various esters, ethers and ketones and any combination thereof in various proportions. The viscosities of these copolmers can be controlled or reduced by the addition of various cosolvents such as the Cellusolves, e.g. butyl Cellusolve ®, Carbitol, Propasol-B, Propasol-P, or the diacetone alcohols and the like.

The polyester prepolymers of this invention are vinyl modified by copolymerizing the polyester prepolymers with at least one ethylenically unsaturated vinyl monomer, e.g. a combination of vinyl monomer such as styrene and acrylic monomers, selected from the group consisting of alkyl methacrylates, alkyl acrylates, acrylic and methacrylic acids, and hydroxyl-containing acrylates, such as hydroxylalkyl acrylate or hydroxyalkyl methacrylate and any combination or mixtures of these vinyl monomers in any proportion. More specifically, the preferred hydroxyalkyl acrylates useful for purposes of this invention, include not only the mono- and polyacrylates such as the mono- or polyhydroxy alkyl di- and triacrlyates or alkylacrylates, e.g. the methacrylates and ethacrylates, but also the halogen-substituted acrylates such as the chlorine or bromine substituted mono- or polyhydroxy alkyl acrylates, e.g.

the mono- or polyhydroxy alkyl chloroacrylates or hydroxychloroalkyl diacrylates or dialkacrylates. More specifically, the hydroxyalkyl acrylates, for purposes of this invention, may be characterized by the formula:

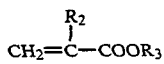

wherein $R_2$ is either hydrogen, a halogen, e.g. chlorine or bromine, an alkyl or substituted alkyl group, e.g. halogen-substituted alkyl group wherein the alkyl group has 1 to 2 carbon atoms and $R_3$ is a mono- or polyhydroxyalkyl or substituted alkyl, e.g. halogen-substituted hydroxyalkyl group having up to 12 and preferably 2 to 8 aliphatic carbon atoms.

The acrylates may be described as esters of acrylic or substituted-acrylic acid including, for example, 2-hydroxypropyl acrylate, 3-hydroxybutyl acrylate, 4-hydroxypentyl acrylate, 5-hydroxypentyl acrylate, 5-hydroxyhexyl acrylate, 2-hydroxybutyl acrylate, 2-hydroxyethyl methacrylate, 2-hydroxyethyl chloroacrylate, 2-hydroxyethyl acrylate, 2-hydroxyethyl ethacrylate, hydroxybutyl ethacrylate, 3-hydroxypropyl methacrylate, 3-hydroxypropyl chloroacrylate, 3-hydroxybutyl acrylate, 4-hydroxybutyl methacrylate, 3-hydroxybutyl ethacrylate, 3-hydroxypropyl ethacrylate, 3-hydroxybutyl chloroacrylate, 3-hydroxypropyl acrylate, 3-hydroxypropyl 2-chloroacrylate, 4-hydroxybutyl acrylate, 3-hydroxyethyl 2-chloroacrylate, 3-hydroxybutyl chloromethacrylate, 5-hydroxypentyl acrylate, 2-hydroxypropyl chloromethacrylate, 5-hydroxypentyl methacrylate, 6-hydroxyhexyl acrylate, 2-hydroxybutyl chloromethacrylate, 2-hydroxyethyl chloroethacrylate, 3-hydroxybutyl methacrylate, 2-hydroxyethyl chloromethacrylate, 2-hydroxypropyl chloroethacrylate, 2-hydroxybutyl dichloroethacrylate, 2-hydroxybutyl chloromethacrylate, 3-hydroxypeopyl-chloromethacrylate, 3-hydroxypropyl chloroethacrylate, 3-hydroxyhexyl chloromethacrylate, 3-hydroxypentyl 2-chloroacrylate, 3-hydroxybutyl bromomethacrylate, 2-hydroxybutyl chloromethacrylate, 4-hydroxybutyl 2-chloroethacrylate, 3-hydroxypentyl 2-chloroethacrylate, 3-hydroxypropyl 2-bromoethacrylate, 4-hydroxybutyl 2-bromoethacrylate, 5-hydropxyhexyl methacrylate, 6-hydroxypentyl chloromethacrylate and various other vinyl or acrylic esters containing at least one free alcoholic hydroxyl group, e.g. a mono- or polyhydroxy alkyl ester of acrylic, methacrylic or ethacrylic acid.

Other acrylic esters that can be used as the vinyl monomer have at least one free hydroxyl group including polyethylene glycol methacrylate, diethylene glycol methacrylate, triethylene glycol methacrylate, tetraethylene glycol methacrylate, dipropylene glycol methacrylate, tetraethylene glycol chloroacrylate, tetraethylene glycol acrylate, tetraethylene glycol dichloroacrylate, glycerol methacrylate, pentaerythritol methacrylate, diethylene glycol monoacrylate, triethylene glycol monoacrylate, dipropylene glycol monoacrylate, trimethylol ethane diacrylate, trimethylol propane diacrylate, pentaerythritol triacrylate, glycerol acrylate, pentaerythritol monoacrylate, trimethylol ethane monoacrylate, trimethylol propane monoacrylate, trimethylol ethane chloroacrylate, trimethylol propane methacrylate, trimethylol butane methacrylate, tetramethylene glycol chloroacrylate, triethylene glycol methacrylate, tetraethylene glycol acrylate, pentaerythritol dichloroacrylate, dipentaerythritol diacrylate, dipentaerythritol triacrylate pentaerythritol dimethacrylate, pentaerythritol methacrylate and combinations of any of these hydroxy-containing acrylates in various proportions.

The styrenes that may be used in combination with the acrylic monomers may be characterized by the formula:

wherein R is hydrogen or an alkyl group of 1 to 4 carbon atoms, e.g. tertiarybutyl styrene and may be present in amounts ranging from about 0% to 70% and preferably in amounts ranging from 5 to 30 parts by weight of the total mixture of vinyl monomers. The alkyl-substituted styrene may be either an ortho-, meta- or para-alkyl-substituted styrene such as para-substituted tertiary-butyl styrene.

The following illustrates the preparation of the water reducible air drying acrylic modified polyesters in accordance with this invention:

EXAMPLE I (Polyester Prepolymer)

| Reactants | Parts By Weight |
|---|---|
| Styrene-Allyl Alcohol Copolymer | 56.4 |
| Soya Fatty Acid No. 1 | 18.3 |
| Crotonic Acid | 10.7 |
| Soya Fatty Acid No. 2 | 10.7 |
| Trimellitic Anhydride | 4.0 |
| Xylene | — |
| Butyl Cellusolve | — |

At about room temperature, the reactor was charged with the styrene-allyl alcohol polymer together with the No. 1 soya fatty acid, crotonic acid and xylene and heated to temperatures of about 480° F. with agitation. The reaction product was cooled to approximately 400° F. and the No. 2 soya fatty acid was added and again heated to about 480° F. Subsequently, the trimellitic anhydride was added to the reaction mixture and held at 320° F. for about 2 hours and then cooled to about 280° F. to obtain a product which appeared substantially clear, had a viscosity of 16 plus, an acid value of 28.1, and a non-volatile material content of 70.

EXAMPLE II (Acrylic Modified Polyester)

| Reactants | Parts By Weight |
|---|---|
| The polyester prepolymer of Example I | 60.0 |
| Butyl Cellusolve | 3.0 |
| Hydroxyethyl Acrylate | 3.0 |
| Methyl Methacrylate | 28.0 |
| Methacrylic Acid | 4.0 |
| Styrene | 2.5 |
| Isobornyl Methacrylate | 2.5 |
| Dibutyl Peroxide | 0.9 |

The polyester prepolymer was charged into the reactor and heated to temperatures of about 280° F. The hydroxyethyl acrylate, methyl methacrylate, methacrylic acid, styrene and isobornylmethacrylate, together with a catalyst, were added dropwise to the reactor over a period of about 4 hours at a temperature of about 280° F. Ditertiarybutyl peroxide was added to the reaction mixture at about 284° F. and held for about 2 hours.

The reaction product was substantially clear in color, had a viscosity of 40 plus, a non-volatile material of 62.8, and an acid value of 40.3.

EXAMPLE III (Polyester Prepolymer)

| Reactants | Parts By Weight |
|---|---|
| Styrene-allyl Alcohol Copolymer | 38.0 |
| Soya Fatty Acid No. 1 | 19.7 |
| Crotonic Acid | 7.2 |
| Xylene | 0.9 |
| Soya Fatty Acid No. 2 | 7.3 |
| Maleinized PAMOLYN 200 ® | 7.3 |
| Butyl Cellusolve | 26.8 |

At about room temperature, to a reactor containing xylene, the soya fatty acid and crotonic acid together with the styrene allyl alcohol polymer were added and the reaction mixture heated to temperature of about 480° F. with agitation. After sufficient reaction time, the xylene was stripped from the reactor and the product was cooled to about 330° F. and reacted with the PAMOLYN 200 ®. Butyl cellusolve was added to obtain a substantially clear product having a non-volatile materials content of 71.0, an acid value of 26.8, and a Gardner-Holdt viscosity of 20.

EXAMPLE IV (Acrylic Modified Polyester)

| Reactants | Parts By Weight |
|---|---|
| The polyester prepolymer of Example III | 60.0 |
| Methyl Methacrylate | 28.0 |
| Methacrylic Acid | 4.0 |
| Hydroxyethyl Acrylate | 3.0 |
| Styrene | 2.5 |
| Isobornyl Methacrylate | 2.5 |
| Ditertiarybutyl Peroxide | — |

The prepolymer was charged into a reactor at about room temperature and heated to about 280° F. with agitation under a nitrogen blanket. Then, the mixture of acrylic and styrene monomers was added gradually, drop-wise, to the heated prepolymer. After several hours at temperatures ranging from 290° F. to 280° F., the product was characterized as being clear in color, a viscosity of 63, a non-volatile material content of 62.8, and an acid value of 39.0.

EXAMPLE V (Polyester Prepolymer)

| Reactants | Parts By Weight |
|---|---|
| Styrene-allyl Alcohol Copolymer | 52.0 |
| Soya Fatty Acid | 28.0 |
| Crotonic Acid | 10.0 |
| Maleinized PAMOLYN 200 ® | 10.0 |

A polyester prepolymer prepared from Example V was further reacted in accordance with the procedure set forth herein with the acrylic monomers identified in Table 1:

TABLE 1

(Acrylic Modified Polyesters)

| Polyester Prepolymer | MAA | HEA | IBOMA | STY | MMA | CAT | Mw × $10^{-3}$ | Mn × $10^{-3}$ | AN |
|---|---|---|---|---|---|---|---|---|---|
| Example V | 4 | 1 | 7.5 | 2.5 | 25 | 3.5 | 27 | 4 | 44.5 |
| Example V | 4 | 3 | 2.5 | 7.5 | 23 | 2.5 | 32 | 4 | 43.2 |
| Example V | 4 | 1 | 2.5 | 7.5 | 23 | 3.5 | 33 | 4 | 44.0 |
| Example V | 4 | 3 | 7.5 | 7.5 | 18 | 2.5 | 36 | 4 | 43.9 |
| Example V | 4 | 1 | 7.5 | 7.5 | 20 | 2.5 | 32 | 4 | 44.1 |
| Example V | 4 | 1 | 7.5 | 7.5 | 20 | 3.5 | 35 | 4 | 42.4 |
| Example V | 4 | 3 | 2.5 | 7.5 | 23 | 3.5 | 35 | 4 | 44.6 |
| Example V | 4 | 3 | 2.5 | 2.5 | 28 | 3.5 | 37 | 4 | 44.8 |
| Example V | 4 | 1 | 2.5 | 2.5 | 30 | 2.5 | 31 | 4 | 45.6 |
| Example V | 4 | 2 | 5.0 | 5.0 | 24 | 3.0 | 32 | 4 | 45.0 |
| Example V | 4 | 3 | 7.5 | 2.5 | 23 | 3.5 | 32 | 4 | 44.9 |
| Example V | 4 | 1 | 2.5 | 2.5 | 30 | 3.5 | 35 | 4 | 43.9 |
| Example V | 4 | 3 | 2.5 | 2.5 | 28 | 2.5 | 35 | 4 | 44.0 |
| Example V | 4 | 3 | 7.5 | 2.5 | 23 | 2.5 | 32 | 4 | 45.5 |
| Example V | 4 | 2 | 5.0 | 5.0 | 24 | 3.0 | 38 | 4 | 43.3 |
| Example V | 4 | 3 | 7.5 | 7.5 | 18 | 3.5 | 42 | 4 | 43.0 |
| Example V | 4 | 1 | 7.5 | 2.5 | 25 | 2.5 | — | 4 | 44.7 |
| Example V | 4 | 1 | 2.5 | 7.5 | 25 | 2.5 | 35 | 4 | 44.5 |
| Example V | 4 | 2 | 5.0 | 5.0 | 24 | 3.0 | — | 4 | 43.3 |

MAA = Methacrylic Acid
HEA = hydroxyethyl Acrylate
IBOMA = isobornyl Methacrylate
STY = Styrene
MMA = Methyl Methacrylate
CAT = Catalyst level
Mw = Wt. Average Molecular Wt.
Mn = Number Average Molecular Wt.
AN = Acid Number Paints were formulated from the acrylic modified polyesters identified in Table 1 as follows:

EXAMPLE VI

White Paint Formula

| Components | Parts By Weight |
|---|---|
| Resin (Table 1) | 364.3 |
| Ortho Cresol | 0.5 |
| Aqueous Ammonia | 4.3 |
| Water | 212.0 |
| Titanium dioxide | 168.5 |
| 6% Manganese Catalyst | 2.1 |
| 5% Calcium Octoate | 4.4 |
| 8% Zinc Napthenate | 1.4 |
| Propasol-P Solvent | 4.4 |
| Water | 223.3 |
| PVC | 16.7 |
| NVM | 40.1 |
| Vol. Sol. | 29.4 |
| Wt/Gal | 9.56 |
| VOC | 3.15 |

EXAMPLE VII

Metallic Paint Formula

| Components | Parts By Weight |
|---|---|
| Resin (Table 1) | 334.82 |
| Methyl Ethyl Ketone | 16.65 |
| 2-Ethoxyethyl Acetate | 16.28 |
| Ortho Cresol Solution | 0.66 |
| Base Sparkle Silver | 9.51 |
| 6% Manganese Catalyst | 1.91 |
| 5% Calcium Octoate | 4.14 |
| 8% Zinc Napthenate | 1.26 |
| Aqueous Ammonia | 12.68 |
| Water | 458.88 |
| PVC | 1.1 |
| NVM | 25.1 |
| Vol. Sol. | 22.8 |
| Wt/Gal | 8.31 |
| VOC | 3.83 |

EXAMPLE VIII

| Reactants | Parts By Weight |
|---|---|
| Soya Fatty Acid | 19.7 |
| Styrene-allyl Alcohol Copolymer | 38 |
| Crotonic Acid | 7.2 |
| Maleinized Oleic and linoleic Acids | 7.3 |
| Butyl Cellosolve | 26.8 |
| Xylene | 1.0 |

A water dispersable prepolymer having an acid value above about 26 was prepared by charging the soya fatty acid, the crotonic acid and styrene-allyl alcohol copolymer with the xylene in a reactor and heated to temperatures ranging up to about 480° F. After about 3 hours at 480° F., the acid value of the reaction mixture ranged from about 6 to 8 and had a viscosity of 13. The reaction was cooled to about 400° F. and the remaining portion of the soya fatty acid was added and the reaction heated to 480° F. The reaction was cooled to about 330° F. and the maleinized oleic and linoleic acid (Pamolyn 200 ®) was added and held at a temperature of about 320° F. for about 2 hours. The reaction was then mixed with the butyl cellosolve at a temperature of 320° F. and strained through a GAF bag. The characteristics of the reaction product are as follows:

| CHARACTERISTICS | |
|---|---|
| NVM | 69–71 |
| A.V. | 26–30 |
| Viscosity | 16–25 |
| Wt./Gal. | 8.15–8.25 |
| Color | 16 Max. |
| Clarity | Clear |

EXAMPLE IX

Prepolymer of Example VIII was reacted with the ethylenically unsaturated monomers as follows:

| Reactants | Parts By Weight |
|---|---|
| Pre-polymer of Example VIII | 53.4 |
| Butyl Cellosolve | 20.5 |
| Methyl Methacrylate | 17.4 |
| Methacrylic Acid | 2.5 |
| hydroxyethyl acrylate | 1.9 |
| Styrene | 1.6 |
| Isobornyl Methacrylate | 1.6 |
| Di-tertiary Butyl Peroxide | 1.1 |

The pre-polymer of Example VIII was charged into a reactor in combination with the butyl cellosolve and heated from room temperature to about 280° F. The methyl methacrylate, methacrylic acid and hydroxyethyl acrylate, styrene and isobornyl methacrylate and the di-tertiary butyl peroxide were added slowly (dropwise) to the reactor over a period of about 4 hours. The reaction temperature was maintained at about 280° F. for a total reaction time of approximately 8 hours and the product was strained through a GAF bag. The characteristics of the polymer are indicated below:

| CHARACTERISTICS (TENTATIVE) | |
|---|---|
| NVM | 62–64 |
| A.V. | 37–41 |
| Viscosity | 50–80 strokes |
| Wt./Gal. | 8.35–8.45 |
| Color | 13 Max. |
| Clarity | Clear |

A paint was formulated from the resin obtained from Example IX as follows:

EXAMPLE X

| Components | Parts By Weight |
|---|---|
| Resin (Example IX) | 331.07 |
| Aromatic Naphtha 100 Flash | 31.91 |
| Base Sparkle Silver 3500 Alum. | 9.01 |
| Flexol Plasticizer 4GO | 4.84 |
| Ortho Cresol Solution | 0.66 |
| Manganese Catalyst | 1.85 |
| Calcium Catalyst | 4.00 |
| Nuodex 8% Zinc Naphthenate | 0.80 |
| Aqueous Ammonia | 12.29 |
| Water | 460.38 |

The physical characteristics of the paint formulation are as follows:

| PVC | 10.0 |
|---|---|
| NVM | 25.9 |
| VOL SOL | 23.4 |
| WT/GAL. | 8.31 |

-continued

| | VOC | 3.5 |
|---|---|---|

The characteristics of upscaled batches of paint formulated from the resin of Example IX are as follows:

TABLE 2
CHARACTERISTICS OF PAINT BATCHES

| | Acrylic Modified Polyester | Base |
|---|---|---|
| NVM | 63% | 70.4% |
| AV | 39.0 | 26.9 |
| Viscosity | 63 Stokes | 16–20 Stokes |
| Wt/Gal. | 8.40 | 8.20 |
| Color | 12 | 13–14 |
| Clarity | Clear | Clear |
| W/R Viscosity* | 8 ps (30% Solids) | |
| MW | 33,000 | 13,500 |
| MN | 2,000 | 1,600 |
| Tg | No Major Tg Between −100° C. and 200° C. | |

*pH - 7.7

Water borne paints formulated in accordance with this invention are illustrated as follows:

EXAMPLE XI

| Components | Parts By Weight |
|---|---|
| Resin (Example IX) | 300.4 |
| Acetone | 50.0 |
| Ortho Cresol | 2.3 |
| Sparkle Silver 3641 | 5.4 |
| CGL 292 | 6.9 |
| V6 V5 | 1.5 |
| 2-Ethoxyethyl Acetate | 9.1 |
| Aqueous Ammonia | 9.6 |
| Water | 478.0 |
| | 859.9 |
| PVC | 1.0 |
| NVM | 20.6 |
| VOC Soc. | 18.9 |
| pH | |
| Viscosity | |
| Wt/Gal. | 8.34 |
| VOC Level | 3.4 lbs/gal. |

EXAMPLE XII

| Components | Parts By Weight |
|---|---|
| Resin (Example IX) | 331.07 |
| Aromatic Naphta 100 Flash | 31.91 |
| Sparkle Silver 3500 | 9.01 |
| Flexol 4GO | 4.84 |
| Ortho Cresol | 0.66 |
| 5% Manganese Drier | 1.85 |
| 5% Calcium Drier | 4.00 |
| 8% Zinc Drier | 0.80 |
| Ammonia | 12.29 |
| Water | 460.38 |
| PVC | 1.0 |
| NVM | 25.9 |
| VOC Soc. | 23.4 |
| pH | |
| Wt/Gal. | 8.31 |
| VOC Level | 3.55 lbs/gal. |

EXAMPLE XIII

| Components | A Parts By Weight | B Parts By Weight |
|---|---|---|
| Resin (Example IX) | 622.62 | 675.68 |
| 2 Butoxy Ethanol | 31.34 | 35.01 |
| Moly Orange YEY98D | 142.65 | — |
| Monastral Violet R | — | 56.01 |
| Ortho Cresol Sol. | 1.03 | 1.17 |
| 6% Manganese Drier | 2.89 | 3.15 |
| 5% Calcium Drier | 7.44 | 8.05 |
| 8% Zinc Naphthenate | 2.27 | 2.45 |
| Flexol Plasticizer 4GO | 9.10 | 9.92 |
| Aqueous Ammonia | 23.67 | 25.67 |
| Water | 131.28 | 59.52 |
| PVC | 6.3 | 8.1 |
| NVM | 56.4 | 56.8 |
| Vol. Sol. | 46.4 | 51.4 |
| Wt/Gal. | 9.45 | 8.5 |
| VOC Level | 3.23 | 3.2 |

Formulas A and B were mixed in the ratio of 2 parts A to 1 part B to give the desired color.

EXAMPLE XIV

| Components | Parts By Weight |
|---|---|
| Resin (Example IX) | 305.97 |
| Aromatic Naphtha | 29.49 |
| Sparkle Silver 3500 | 8.33 |
| Flexol 4GO | 4.47 |
| Ortho Cresol Soln. | 0.61 |
| Tinuvin 212 | 4.13 |
| 6% Manganese Drier | 1.71 |
| 5% Calcium Drier | 3.70 |
| 8% Zinc Drier | 0.74 |
| Aqueous Ammonia | 11.35 |
| Water | 486.28 |
| PVC | 1.0 |
| NVM | 24.4 |
| Vol. Sol. | 22.1 |
| Wt/Gal. | 8.31 |
| VOC Level | 3.50 lbs/gal. |
| Resin (Example IX) | 317.16 |
| Aromatic Naphtha | 30.58 |
| Flexol 4GO | 4.78 |
| Ortho Cresol Sol. | 0.67 |
| 6% Manganese Drier | 1.75 |
| 5% Calcium Drier | 3.83 |
| 8% Zinc Drier | 0.74 |
| Aqueous Ammonia | 7.86 |
| Water | 487.00 |
| NVM | 24.3 |
| Vol. Sol. | 22.2 |
| Wt/Gal. | 8.29 |
| VOC Level | 3.54 lbs/gal. |

The acrylic modified polyesters of this invention can be utilized in the preparation of aqueous coatings in accordance with the following formula:

EXAMPLE XV

| Components | Parts By Weight |
|---|---|
| Acrylic Modified polyesters from Table 2 | 25 to 60 |
| Pigments (TiO$_2$) | 0 to 60 |
| Dispersing Surfactants | 0 to 10 |
| Rheology Control Agent, e.g. polyacrylate | 0 to 5 |
| Antifreeze Agent, e.g. ethylene glycol | 0 to 5 |
| Antifoam Agents | 0 to 4 |
| Coalescent Solvents | 0 to 30 |
| Ammonia Hydroxide to a pH of | 7.5 to 9.5 |
| Plasticizers | 0 to 35 |
| Driers | 0.1 to 10 |
| Water | Balance (e.g. up to about 95 parts |

| Components | Parts By Weight |
|---|---|
| | by weight) |

In utilizing the vinyl modified polyesters, i.e. the acrylic modified polyesters of this invention, in the formulation of paint, it is within the skill of one in the art to utilize other well known components, i.e. pigments, driers and the like, with the paint formulas. More specifically, water may be present in amounts ranging up to about 95 parts by weight, e.g. 5 to 60 parts with the cosolvent ranging from about 1.0 to 15 parts. Typical pigments used in the coating compositions include the metal oxides such as titanium dioxide, iron oxide, zinc oxide, metallic flakes such as aluminum, bronze or nickel flake, metallic powders, metallic hydroxides, malybdate pigments, carbonate pigments, carbon black, silica pigments, and various other organic and/or inorganic pigments commonly used for coatings. These pigments are generally used in combination with the binders at a weight ratio of about 0.1 to 100 parts by weight of the pigment for every 100 parts by weight of the resin or binder which forms the film of the coating. Generally the pigments are dispersed in the resin forming a dispersion which is then added to the coating formulation.

In addition, well known organic and inorganic compounds are used as the driers in amounts ranging from about 0.1 to 10% by weight of the total composition. Generally these driers are well known and include such materials as cobalt, copper, lead, calcium, nickel, tin, zinc, and various organic salts such as cobalt naphthenate, copper naphthenate, lead tallate, iron naphthenate, calcium naphthenate, nickel octoate, cobalt octoate, iron octoate and various tin salts such as the alkyl tin dilaurates, e.g. dibutyl tin dilaurate and the like.

In addition, conventional plasticizers may be used in the coating in amounts ranging from 0% to about 35%, more likely in the range of about 10 to 25%, parts by weight of the plasticizer based on the weight of the resin.

The coatings of this invention may be applied to various substrates, i.e. metal substrates, by using conventional techniques, such as spraying, brushing, roller coating, coil coating, and the like. These are applied to either a treated or untreated metal surface which are then allowed to dry at ambient temperatures.

As indicated herein, surfactants may be present in the aqueous coating composition in amounts ranging from about 0 to 10 parts by weight, and preferably in amounts ranging from about 0.1 to 2.0 parts by weight based on the total weight of pigments. These surfactants are well known in the paint art and particularly include such materials as Strodex ® surfactants which are characterized as phosphated coesters of alcohol and aliphatic ethoxylates, the Aerosol ® OT's including the salts of dialkyl sulfosuccinates, the Tamol ® dispersants which are alkali metal and ammonium salts of polymeric carboxylic acid, Triton ® which includes the sodium salts of dialkyl sulfosuccinates, and the nonionic surfactants including the benzyl ether of octophenol ethylene oxide aducts, the nonyl phenoxy ethanol aducts, the octyl phenoxy polyethoxy ethanols, the salts of alkyl aryl polyether sulfonates, the alkyl aryl polyether alcohols, the Igepals ® surfactants including the ethoxylated alkyl phenols, etc.

Particularly useful anionic surfactants or dispersants include the Tamols ®, i.e. the polycarboxylates, the Strodex ® phosphate esters and the Aerosols ®, i.e. the sulfosuccinates. Particularly useful nonionics include the Triton ® and Igepal ® surfactants, e.g. octylphenoxy polyethoxy ethanol, etc.

If necessary from 0 to 30 parts by weight of a coalescing solvents may be included in the aqueous coating composition. Specific coalescing agents are available as Texanol ® (2,2,4trimethyl-1,3-pentanediol monoisobutyrate). Other coalescing agents particularly useful include the Cellosolves ® such as 2-butoxy ethanol(-butylcellusolve) and Carbitols ®.

In addition to the above, various defoaming agents are generally added in amounts ranging from 0 to 4 and more likely 0.1 to 2.0 parts by weight of the total aqueous composition. These defoaming agents are well known in the paint industry and include the various non-silicone anti-foam compounds such as the silica-organic materials and the silicone-containing materials, i.e. silica-silicone organic compounds.

It is a practice in formulating paints to include primary pigments, i.e. TiO$_2$, alone or with extenders such as carbonates, talc, silicates, china clays, silicas, micas, etc. The relative proportions of the primary pigment and extenders is not critical and may be varied over a wide range. Generally, however, the primary pigment is present at a pigment volume concentration to provide the desired paint covering or hiding whereas the extender pigment is present in an amount to provide the paint with a total required pigment volume concentration.

The pigment composition is preferably dispersed in the aqueous system with colloidal bodying agents and auxiliary surfactants in addition to the surfactants present in the polymer composition. These surfactants or dispersing agents used to disperse the pigment in the emulsion include the nonionic or anionic and preferably the water soluble compounds. Generally up to about 10%, e.g. less than 5.0%, by weight of the auxiliary dispersing agents are utilized based on the weight of the pigment in order to obtain adequate dispersement of the pigment in the aqueous system.

The rheology characteristics of the paint will vary depending on the use of rheological agents. Thus, the rheology can be adjusted by incorporating in the paint, various compounds including polyacrylic acid, polymethacrylic acid or water soluble copolymers of these acids. In addition, the paint compositions may be improved by adding thickening agents including such cellulose derivatives as methylcellulose, carboxymethylcellulose, hydroxyethylcellulose, etc.

Various anti-freeze agents may be incorporated in the aqueous emulsions to provide the paint with a freeze-thaw stability. Generally, the glycols such as ethylene glycol is useful and may be used in concentrations ranging up to about 5% by weight of the total composition.

The paint compositions prepared in accordance with this invention may be either clear or pigmented and are characterized with outstanding penetration of the various surfaces to which it is applied. In addition, the coatings of this invention have outstanding durability with respect to weathering and may be subjected to humid and rainy conditions in addition to ultraviolet light exposure and are substantially stable under relatively high heat conditions.

While this invention has been described with respect to a number of specific embodiments, it is obvious that there are other variations and modifications which can be made without departing from the spirit and scope of the invention as more particularly set forth in the appended claims.

The invention claimed is:

1. A water reducible air drying acrylic modified polyester having an acid value greater than about 25 obtained by the copolymerization of:
   (a) from about 50 to 70 parts by weight of a polyester prepolymer, and
   (b) from about 30 to 50 parts by weight of a combination of ethylenically unsaturated vinyl monomers comprising at least one acrylic monomer;
said polyester prepolymer obtained from the reaction of (i) a styrene-allylic alcohol polymer with (ii) at least one unsaturated fatty acid, and (iii) at least one unsaturated monocarboxylic acid having the formula:

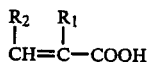

wherein R1 is either hydrogen or an alkyl group of 1 to 3 carbon atoms and R2 is an aliphatic group of 1 to 4 carbon atoms or an aryl group to obain hydroxy-functional polymers and subsequently reacting said hydroxy-functional polymer with (iv) at least one monoanhydride having at least one free carboxylic acid group.

2. The acrylic modified polyester of claim 1 further characterized in that said prepolymer is obtained by the reaction of about 40 to 65 parts by weight of the styrene-allylic alcohol polymer with from about 15 to 35 parts by weight of at least one unsaturated fatty acid and from about 5 to 15 parts by weight of the unsaturated monocarboxylic and from about 5 to 15 parts by weight of at least one monoanhydride having at least one free carboxylic acid group.

3. The acrylic modified polyester of claim 2 further characterized in that approximately 55 to 65 parts by weight of the polyester prepolymer is reacted with about 35 to 45 parts by weight of at least one ethylenically unsaturated acrylic monomer; wherein said polyester prepolymer is obtained by the reaction of about 50 to 60 parts by weight of the styrene-allylic alcohol polymer, about 20 to 30 parts by weight of at least one unsaturated fatty acid and from about 8 to 12 parts by weight of the unsaturated monocarboxylic acid and about 3 to 10 parts by weight of at least one monoanhydride having at least one free carboxylic acid group.

4. The acrylic modified polyester of claim 3 further characterized in that the monocarboxylic acid is crotonic acid.

5. The acrylic modified polyester of claim 3 further characterized in that the monoanhydride is a maleinized fatty acid.

6. The acrylic modified polyester of claim 5 further characterized in that the maleinized fatty acid is maleinized oleic and linoleic acid.

7. The acrylic modified polyester of claim 2 further characterized in that approximately 55 to 65 parts by weight of the polyester prepolymer is copolymerized with about 35 to 45 parts by weight of a combination of the ethylenically unsaturated vinyl monomers.

8. The acrylic modified polyester of claim 7 further characterized in that at least one of the ethylenically unsaturated vinyl monomers is selected from the group consisting of hydroxyalkyl acrylates, methacrylic acid, acrylic acid, isobornyl methacrylate, alkyl methacrylate.

9. The acrylic modified polyester of claim 8 further characterized in that the ethylenically unsaturated vinyl monomers comprise a mixture of styrene with at least one acrylic monomer.

10. The acrylic modified polyester of claim 9 further characterized in that the acrylic monomer is methacrylic and/or acrylic acid.

11. The acrylic modified polyester of claim 1 further characterized in that the unsaturated fatty acid comprises soya fatty acid and the unsaturated monocarboxylic acid comprises crotonic acid.

12. The acrylic modified polyester of claim 1 further characterized in that the monoanhydride is trimellitic anhydride.

13. The acrylic modified polyester of claim 1 further characterized as having an acid value greater than 40.

14. A method of preparing a water reducible air drying arcylic modified polyester having an acid value greater than about 25 which comprises copolymerizing:
   (a) from about 50 to 70 parts by weight of a polyester prepolymer, and
   (b) from about 30 to 50 parts by weight of a combination of ethylenically unsaturated vinyl monomers comprising at least one acrylic monomer;
said polyester prepolymer obtained from the reaction of (i) a styrene-allylic alcohol polymer with (ii) at least one unsaturated fatty acid, and (iii) at least one unsaturated monocarboxylic acid having the formula:

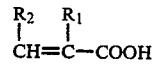

wherein $R_1$ is either hydrogen or an alkyl group of 1 to 3 carbon atoms and $R_2$ is an aliphatic group of 1 to 4 carbon atoms or an aryl group to obtain hydroxy-functional polymers and subsequently reacting said hydroxy-functional polymers with at least one monoanhydride having at least one free carboxylic acid group.

15. The method of claim 14 further characterized in that the copolymerization of the polyester prepolymer and the ethylenically unsaturated vinyl monomers is in the presence of organic solvents.

16. The method of claim 14 further characterized in that the unsaturated fatty acid comprises soya fatty acid, the unsaturated monocarboxylic acid comprises crotonic acid and the monoanhydride is trimellitic anhydride.

17. The method of claim 14 further characterized in that the monoanhydride is a maleinized linoleic and oleic acid.

18. A water reducible air drying coating composition comprising 25 to 60 parts by weight of an acrylic modified polyester having an acid value greater than about 30, from 0 to 60 parts by weight of pigment, from 0 to 30 parts by weight of a cosolvent, and up to about 95 parts by weight of water; said acrylic modified polyester obtained by the copolymerization of:
   (a) from about 50 to 70 parts by weight of a polyester prepolymer, and
   (b) from about 30 to 50 parts by weight of a combination of ethylenically unsaturated vinyl monomers comprising at least one acrylic monomer;
said polyester prepolymer obtained from the reaction of (i) a styrene-allylic alcohol polymer with (ii) at least one unsaturated fatty acid, and (iii) at least one unsaturated monocarboxylic acid having the formula:

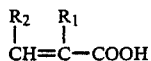

wherein $R_1$ is either hydrogen or an alkyl group of 1 to 3 carbon atoms and $R_2$ is an alkyl group of 1 to 4 carbon atoms or an aryl group to obtain a hydroxy-functional polymer and subsequently reacting said hydroxy-functional polymer with (iv) at least one monoanhydride having at least one free carboxylic acid group.

19. The coating composition of claim 18 further characterized in that the water is present in an amount ranging from about 5 to 60 parts by weight and the cosolvent is present in amounts ranging from about 1.0 to 15 parts by weight.

20. The coating composition of claim 18 is further characterized in that the acrylic modified polyester has an acid value grater than 40.

* * * * *